United States Patent
Takeuchi et al.

(10) Patent No.: US 6,742,560 B2
(45) Date of Patent: Jun. 1, 2004

(54) METHOD AND APPARATUS FOR MANUFACTURING FIBER BUNDLE WITH INJECTED AIR

(75) Inventors: Junji Takeuchi, Kariya (JP); Yasuki Miyashita, Kariya (JP); Yoshiharu Yasui, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 10/167,128

(22) Filed: Jun. 10, 2002

(65) Prior Publication Data

US 2002/0157765 A1 Oct. 31, 2002

Related U.S. Application Data

(62) Division of application No. 09/699,883, filed on Oct. 30, 2000.

(30) Foreign Application Priority Data

Nov. 26, 1999 (JP) .......................... 11-336394

(51) Int. Cl.[7] .............................. B65H 69/06
(52) U.S. Cl. ................ 156/433; 156/441; 156/502; 57/22; 57/23; 57/350
(58) Field of Search .................. 156/433, 441, 156/502, 158; 57/22, 23, 350, 908

(56) References Cited

U.S. PATENT DOCUMENTS 3,871,164 A * 3/1975 Nunn ........................ 57/22
4,468,919 A    9/1984 Nakajo et al. .............. 57/22
5,039,373 A * 8/1991 Gilhaus ..................... 156/433
5,765,352 A * 6/1998 McRae ....................... 57/22
6,485,592 B1 * 11/2002 Yoshimura et al. ......... 156/148

FOREIGN PATENT DOCUMENTS

| JP | 54-106644 | 8/1979 | |
| JP | 56-145075 | 11/1981 | |
| JP | 59-39662 | 3/1984 | |
| JP | 5-86532 | 4/1993 | ............ D02G/3/22 |
| JP | 8-284036 | 10/1996 | ............ D02G/3/16 |

* cited by examiner

Primary Examiner—Jeff H. Aftergut
Assistant Examiner—Todd J Kilkenny
(74) Attorney, Agent, or Firm—Morgan & Finnegan, LLP

(57) ABSTRACT

Two flat fiber bundles of non-twisted filaments are arranged in an overlapped relationship or in a parallel and adjoining relationship, and held by a gripper at two points spaced apart from each other in the filament-extending direction. Compressed air is injected from a nozzle to the overlapped portion of the fiber bundles between the holding points at a plurality of positions arranged in the direction transverse to the filament-extending direction to cause the adjacent filaments to be entangled. The nozzle is moved across the fiber bundles while injecting air. Filaments are thus opened and rotated by the injected air, and thus entangled. A fiber bundle joining apparatus includes support sections and a receiving section provided in a base, a gripper cooperating with the support sections to grip overlapped ends of fiber bundles therebetween, a nozzle, and a regulating member to temporarily hold the fiber bundles and to allow the lower fiber bundle to be slackened.

2 Claims, 14 Drawing Sheets

Prior Art

Prior Art

METHOD AND APPARATUS FOR MANUFACTURING FIBER BUNDLE WITH INJECTED AIR

This is a divisional of co-pending application Ser. No. 09/699,883 filed Oct. 30, 2000, still pending.

BACKGROUND OF THE INVENTION

1. Field of the Invention

The present invention relates to a flat fiber bundle and to a method and an apparatus for manufacturing the same.

2. Description of the Related Art

In the case where non-twisted multifilament (long staple fiber) yarns (fiber bundle) are used as reinforcement fibers for producing a fiber reinforced composite structure, there is a method such as a filament winding method wherein a fiber bundle is impregnated with a solution of resin and wound on a mandrel, and the resin is then cured. There is also a method wherein a three-dimensional woven fabric (three-dimensional fibrous structure) is formed of fiber bundles, impregnated with a solution of resin, and the resin is then cured.

When the non-twisted fiber bundle is wound, for example, on the mandrel, the fiber bundle is wound in a flat condition due to a winding force. Similarly, when the three-dimensional fibrous structure is manufactured, a fibrous layer constituting the three-dimensional fibrous structure is compressed for the purpose of increasing the content of reinforcement fibers per unit volume, whereby the fiber bundle becomes flat in shape.

In the case where the fiber reinforced composite structure is manufactured by the filament winding method, or when the three-dimensional fibrous structure is used as a reinforcement material of the fiber reinforced composite structure, it is preferable to arrange the fiber bundles in an opened state from the beginning to ensure physical properties of the resultant composite structure. In this regard, the opened state refers to a state wherein filaments constituting the fiber bundle are spread in the widthwise direction to flatten the fiber bundle.

In the filament winding method or the method for the production of three-dimensional fibrous structure, since the fiber bundle is unwound from the bobbin, it is necessary to join the fiber bundle on the bobbin to a fiber bundle on the next bobbin before the former has been completely exhausted. If the fiber bundles are joined by forming a knot as in the piecing of ordinary yarns, knots remain in the resultant product in a non-opened state and the physical property of the product is deteriorated. Therefore, a method has been proposed wherein ends of fiber bundles are joined together, by the entanglement of filaments, without using knotting.

For example, Japanese Unexamined Patent Publication (Kokai) No. 51-147569 discloses a method for joining strands of a plurality of continuous fibers by overlapping ends of the strands with each other and applying an air stream to the overlapped portion to cause the filaments therein to be entangled with each other. The joining apparatus used for this purpose is shown in FIG. 16A in the attached drawings, and comprises a tubular casing 81 having a substantially vertical air inlet port 82 positioned in the casing at the center thereof, a pair or more of air exit ports 83 on the opposite ends of the casing, and a pair of gripper sections 85 for gripping strands 94 so that the center of the overlapped portion of the strands is at the center of the casing.

Also, Japanese Unexamined Patent Publication (Kokai) No. 6-100246 discloses an apparatus for joining fiber bundles wherein ends of two fiber bundles are overlapped with each other and air is injected to the overlapped portion to cause filaments forming the fiber bundles to be entangled, as shown in FIG. 17 of the attached drawings. This apparatus comprises an apparatus body 86 having a supporting section 89, and a cover plate 88 coupled to the apparatus body 86 by a hinge 87. A plurality of elongated flow control plates 90 are arranged on the supporting section 89 in parallel to each other at a predetermined interval so that the short sides thereof extend vertically. The outermost flow control plate 90 is slightly higher than the others.

The cover plate 88 is provided with a rectangularly annular fiber holding member 92 having an air blowing window 91. The fiber holding member 92 is provided with a plurality of pressing thin rods 94 fixed at opposite ends thereof to a pair of support rods 93 arranged parallel to the flow control plates 90, and an air injection nozzle 95. The air injection nozzle 95 is movable in the direction perpendicular to the flow control plates 90. Two fiber bundles (not shown) are placed on the support section 89 with the ends thereof in an overlapped state and after the cover plate 88 is placed on the apparatus body 86, the fiber bundles are joined together by injecting air from the air ejection nozzle 95 which is moved in the direction perpendicular to the flow control plates 90.

In the joining method disclosed in Japanese Unexamined Patent Publication No. 51-147569, portions of the joined strands in the vicinity of the gripped portions are narrowed, as shown in FIG. 16B, since the joining operation is carried out by rotating the portion of the strands in the tubular casing 81 as a whole by the turbulent air stream impinging on the central region of the strands. Filaments in the narrowed portions are difficult to open, and if such a joined region is inserted and mixed in the resultant composite structure, a matrix-rich portion is generated to deteriorate the physical property of the manufactured product. If the narrowed portions are in a state to be readily opened, the connecting strength is lowered.

On the contrary, in the method disclosed in Japanese Unexamined Patent Publication No. 6-100246, the fiber bundles to be joined are acted on by air while the ends of fiber bundles are in a free condition and portions of the fiber bundles adjacent to the overlapped portion are held. The fibers are prevented from moving in the lateral direction (perpendicular to the lengthwise direction of the filaments), by the action of the flow control plates 90, and the filaments are entangled with each other without dispersing in the lateral direction, resulting in the improvement of the withdrawing strength. However, since the fiber bundles are subjected to the air action while the ends of the fiber bundles are in a free state, the orientation of the filaments in the joined region is largely disturbed, and the physical property of the resultant composite, structure is deteriorated.

Also, in the prior art, there is a three-dimensional fibrous structure for reinforcing a composite structure formed by a plurality of cloth sheets superposed on each other with a fastening thread. The cloth sheet is convenient for handling and is easily laid on a curved surface. However, since at least one of warp yarns and weft yarns forming the cloth sheet are arranged in a meandering manner, the physical property of the resultant composite structure is deteriorated in comparison with that using a reinforcement material in which filaments forming each of layers are linearly arranged. Accordingly, if there was a one-directional material convenient in handling such as the cloth sheet and having filaments linearly arranged in one plane, a three-dimensional structure excellent in physical property would be easily obtainable.

SUMMARY OF THE INVENTION

The present invention has been made in view of the above-mentioned problems in the prior art, and the first object of the present invention is to provide a fiber bundle which can be easily handled and which is formed by joining a plurality of flat fiber bundles of non-twisted filaments, wherein filaments in the joined region of the fiber bundles are movable in the direction perpendicular to the filament-extending direction to have a large degree of freedom in shape but not too loose.

The second object of the present invention is to provide a method for joining fiber bundles.

The third object of the present invention is to provide a method for joining two flat fiber bundles of non-twisted filaments so that a degree of freedom in the shape is large even in the joined region and the ease of handling is not lowered.

The fourth object of the present invention is to provide an apparatus for joining fiber bundles in accordance with the above-mentioned method.

In addition, the fifth object of the present invention is to provide a flat fiber bundle of non-twisted filaments capable of expanding and contracting in the direction perpendicular to the filament-extending direction but not randomly separate from each other.

The sixth object is to provide a method for manufacturing such a fiber bundle.

To achieve the first object, a fiber bundle according to the present invention is manufactured by holding a plurality of flat fiber bundles of non-twisted filaments (long staple fibers) arranged in a first direction in an at least partly overlapped relationship or in a parallel and adjoining relationship at two points spaced apart from each other in the first direction, and injecting gas to the fiber bundles between the two points at a plurality of positions viewed in a second direction transverse to the first direction to cause the adjacent filaments to be entangled with each other.

Thus, the obtained fiber bundle is expandable and contractible in the direction perpendicular to the first, filament-extending direction even in the joined region, and is not too loose, i.e., it is difficult to separate the individual filaments from each other. As a result, the ease of handling is improved.

Preferably, the plurality of flat fiber bundles are arranged in parallel to each other so that a sheet is formed by the entanglement of adjacent filaments. Thus, the inventive fiber bundle is suitable for forming a one directional material by being impregnated with resin therein or producing a three-dimensional fibrous structure by superposing the sheets instead of cloth sheets.

To achieve the second object, a method for joining fiber bundles according to the present invention comprises the steps of holding a plurality of flat fiber bundles of non-twisted filaments arranged in a first direction in an at least partly overlapped relationship or in a parallel and adjoining relationship, at two points spaced apart from each other in the first direction, and injecting gas to the fiber bundles between the two points at a plurality of positions, viewed in a second direction transverse to the first direction, to cause the adjacent filaments to be entangled with each other.

In this arrangement, since the fiber bundles are subjected to the gas injection while being held at two points spaced apart from each other in the filament-extending direction, the filaments are rotated with the gripped portions functioning as fulcrums and entangled with each other. Accordingly, the filaments are arranged basically in the lengthwise direction of the fiber bundle even in the joined region.

To achieve the third object, the plurality of fiber bundles are preferably two flat fiber bundles, and ends of the fiber bundles are joined together under the condition wherein the ends are overlapped with each other. Thus, the two flat fiber bundles are maintained in a flat state even in the joined region so that it is expandable and contractible in the widthwise direction and has a large degree of freedom in shape even in the joined region, whereby the ease of handling becomes equal to that of a single fiber bundle.

Preferably, the ends of the fiber bundles are overlapped with each other so that the fiber bundle located closer to the gas-injection side is slack. Thus, since the filaments located closer to the gas-injection side are subjected to the gas-injection, a moving range of the filaments becomes larger when they are rotated about the gripped portions defining the fulcrums to enhance the entanglement thereof with those farther from the gas-injection side and the tensile strength is enhanced.

Preferably, when the ends of both the fiber bundles are overlapped, the end portions of the fiber bundles to be overlapped with each other are wider in comparison with the remaining portions of the fiber bundles and gas is injected to the overlapped portion to join the fiber bundles together, and thereafter the overlapped portion is folded so that the width of the folded portion becomes half of the width of the fiber bundle before folding, the gas is injected in the same manner as described above under the condition wherein the overlapped portion is held at two points spaced apart from each other in the filament-extending direction to cause the filaments to be entangled in the overlapped portion.

In this arrangement, when the two fiber bundles are joined together, portions to be overlapped are first widened, for example, the width is spread to about 1.5 to 2 times of the width of the other portions, and then gas is injected to join the fiber bundles together. Next, the overlapped portion is folded so that the width of the folded fiber bundle becomes half of the width of the fiber bundle before folding, and gas is injected to the overlapped portion while holding two points spaced apart from each other in the filament-extending direction to join the fiber bundles together. Thus, one of the free ends of the fiber bundles appears on the outer surface of the joined region when the gas is injected with two fiber bundles are simply overlapped with each other, and that one end is positioned in the joined region when the second joining operation is carried out. Therefore, it is possible to assuredly prevent the filament end from turning up when the joined portion of the fiber bundles passes through a guide bar or a supply head.

Preferably, the plurality of fiber bundles are arranged in parallel to each other and suitably subjected to the above-described entanglement treatment by the gas injection so that the adjacent filaments are entangled to each other to form a sheet. Thus, the fiber bundle can be easily produced.

To achieve the fourth object, a fiber bundle joining apparatus according to the present invention comprises a base having a pair of support sections spaced apart from each other in a first direction for supporting ends of flat fiber bundles, a gripper having gripping sections for cooperation with the support sections and moved by an actuator between a gripping position where the fiber bundles are gripped by the gripper and the support sections and a retreating position where the fiber bundles are released, a movable member disposed in the base and movable relative to the base in a second direction transverse to the first direction, a presser provided in the movable member and movable between an operating position where it is capable of pressing the fiber bundles supported by the support sections and a retreated position where it allows the fiber bundles to be rested on the support sections, a nozzle provided in the movable member so that a position thereof opposed to the fiber bundles gripped by the support sections and the gripper is variable as the movable member moves relative to the base, and a returning member for returning the movable member to a reference position.

In this arrangement, when two fiber bundles are joined together, the ends of two fiber bundles extending over the support sections of the base with the presser inserted between them, and are held by the gripper located at the gripping position and the support sections. In this state, gas is injected from the orifice of the nozzle and the movable member moves from the reference position relative to the base in the direction transverse to the fiber bundles. The presser moves together with the movable member, and gas is injected from the nozzle to the fiber bundles at a position from which the presser is retreated from the fiber bundles. The overlapped portion of fiber bundles, the ends of which are nipped between the support sections and the gripper, are made to rotate about the gripped portions defining fulcrums, and are entangled with each other.

Preferably, the gripper is provided with a regulating member located in the vicinity of the gripped fiber bundles for covering the entire portion of the fiber bundles between the support sections when the gripper is located at the gripping position. Thus, according to this embodiment, the gas flow injected from the nozzle changes its direction by the regulating member into the widthwise direction of the fiber bundles, whereby the rotation of filaments about the gripped portions defining fulcrums is facilitated, whereby the strength of the joined portion increases.

To achieve the fifth object, the flat fiber bundles of non-twisted filaments are provided, wherein the adjacent filaments are entangled with each other at a predetermined interval in the filament-extending direction. Thus, the fiber bundle is expandable and contractible in the direction perpendicular to the filament-extending direction, but the filaments thereof are not too loose, whereby the fiber bundle can easily conform to a complicated profile such as a curved surface.

To achieve the sixth object, a method of manufacturing a fiber bundle is provided wherein a single flat fiber bundle of non-twisted filaments is held at two points spaced apart from each other in a filament-extending direction, gas is injected to the fiber bundle between the two points at a plurality of positions viewed in a direction transverse to the filament-extending direction to cause the adjacent filaments to be entangled, and the holding step and the injecting step are performed while displacing the injecting positions in the filament-extending direction.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

The first embodiment of the present invention, wherein ends of two tows as fiber bundles comprising non-twisted filaments (long staple fibers) are joined together, will be described with reference to FIGS. 1A to 9.

Figure 1A:
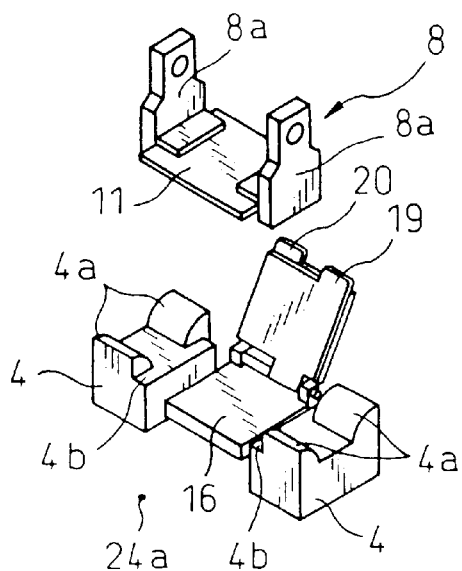
FIGS. 1A to 1F are schematic perspective views illustrating steps of a method of joining fiber bundles according to the first embodiment of the present invention.
Figure 1B:
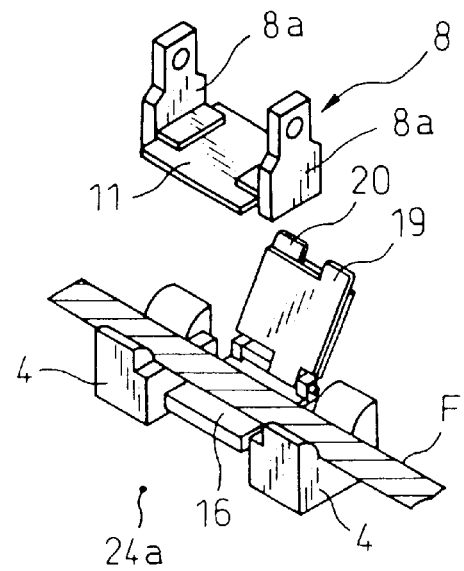

A fiber bundle joining apparatus 1 is first explained. The apparatus 1 includes two support sections 4, arranged at spaced apart positions, onto which fiber bundles F can be placed, and a gripper 8 having gripping plates 8a for cooperation with the support sections 4, as shown in FIGS. 1A and 1B.

Figure 3:
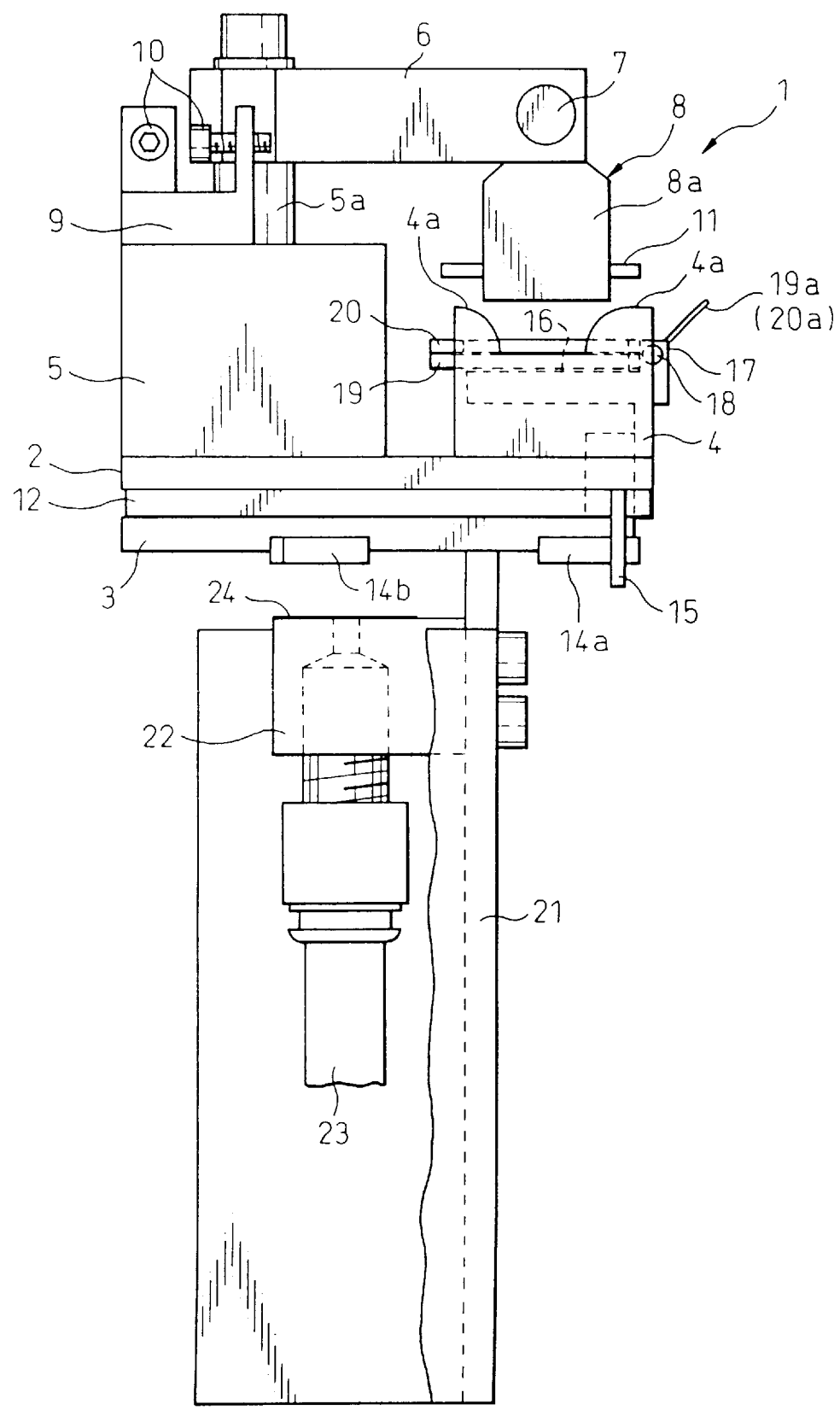
FIG. 3 is a partially broken side view of a fiber bundle joining apparatus.
Figure 4:
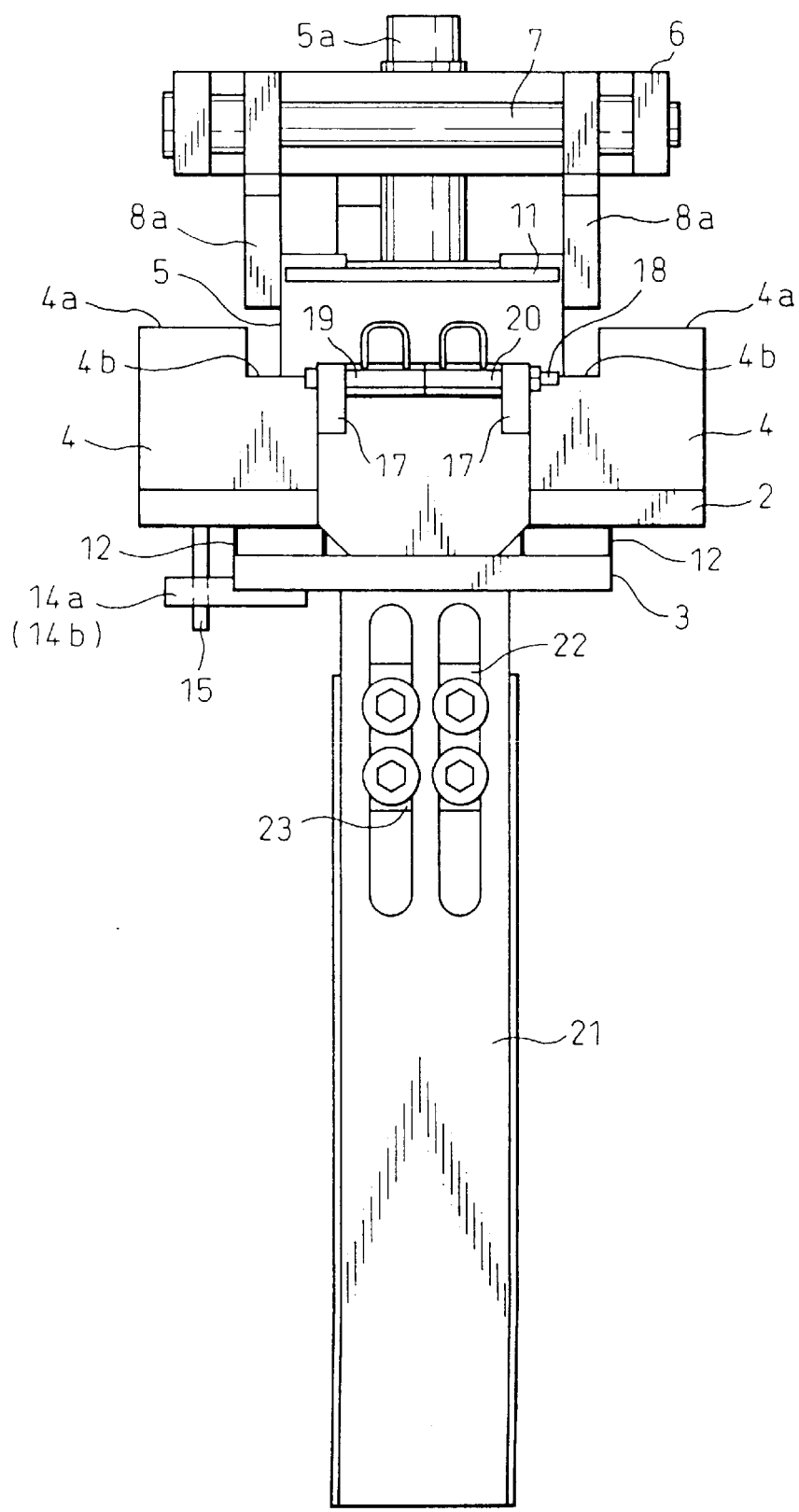
FIG. 4 is a rear view of the apparatus shown in FIG. 3.
Figure 5:
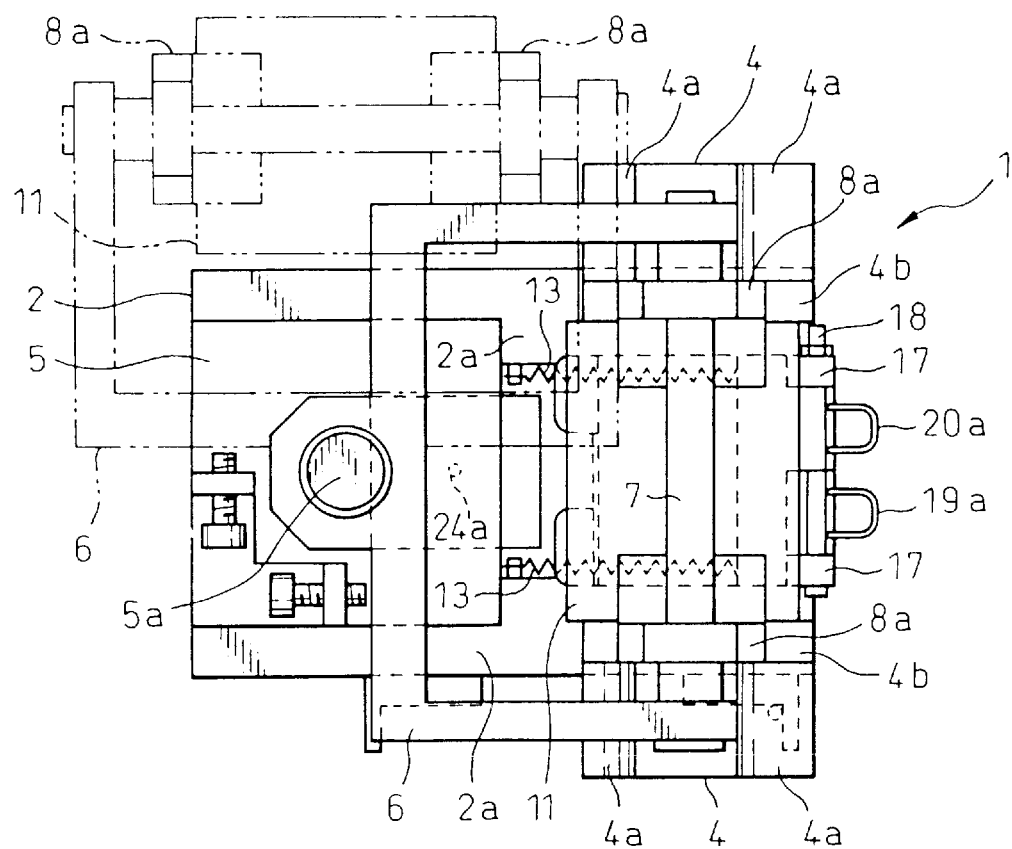
FIG. 5 is a plan view of the apparatus shown in FIG. 3.
Figure 6:
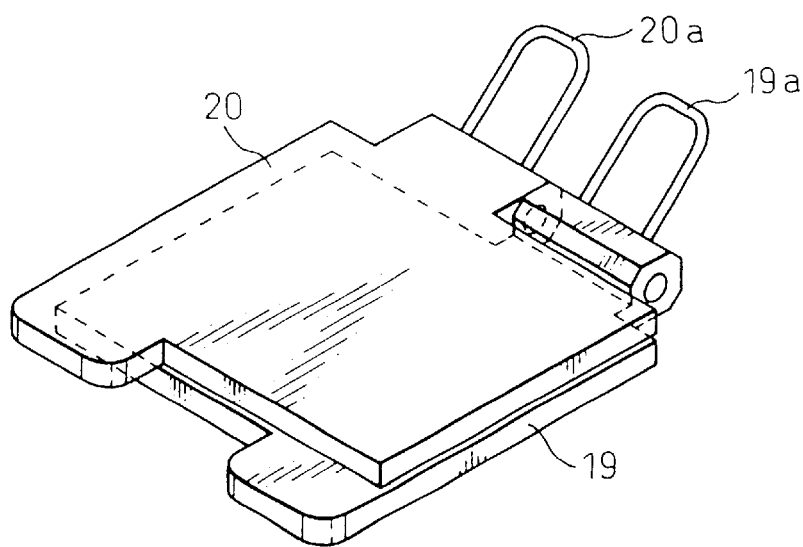
FIG. 6 is a perspective view of the presser.

As shown in FIGS. 3 to 5, the apparatus 1 is provided with a base 2 and a movable member 3 movably arranged in the base 2. The base 2 is of a generally U-shape as seen in a plan view, with a pair of parallel linear portions 2a and a connecting portion between linear portions 2a. Two support sections 4 are arranged on the front ends of the linear portions 2a at a predetermined interval for supporting ends of flat fiber bundles F. Each support section 4 has an upwardly projecting guide 4a having a channel having a width generally equal to the width of the fiber bundle F, for guiding the fiber bundle F so as to extend in the direction perpendicular to the longitudinal direction of the linear portions 2a. Each support section 4 also has a support surface 4b formed at a level lower than the guide 4a and on the inner side thereof to oppose that of the other support section 4.

A pneumatic cylinder 5 as an actuator is fixed to the base 2 at the proximal ends of the linear portions 2a, so that a piston rod 5a thereof extends upward in the vertical direction above the base 2. A U-shaped support arm 6 is fixed to the piston rod 5a, and a support rod 7 is held by the support arm 6 at a front end thereof. A gripper member 8 for gripping the fiber bundles F in association with the support sections 4 is held by the support rod 7. The gripper member 8 includes a pair of gripper plates 8a disposed opposite to the support sections 4. The support arm 6 is rotatable together with the piston rod 5a relative to the pneumatic cylinder 5.

A support bracket 9 is secured to the pneumatic cylinder 5, and two bolts 10 are screw-engaged with the support bracket 9 to extend in directions perpendicular to each other, respectively, which bolts are used as an interception member for suppressing the rotation of the support arm 6 when the latter abuts against the former. The support arm 6 is rotatable between an operating position where the gripper member 8 is opposed to the support sections 4 as indicated by the solid line in FIG. 5 and a retreating position rotated at 90 degrees from the operating position where the gripper member 8 is not opposed to the support section 4 as indicated by the chain line in FIG. 5. Also, the gripper member 8 is movable by the action of the pneumatic cylinder 5 between a gripping position where the fiber bundles F are gripped by the gripper member 8 in association with the support sections 4 and a retreating position where the fiber bundles F are released from the gripper member 8.

A regulating member 11 is supported by the gripper member 8 between the gripper plates 8a. The regulating member 11 is wider than the fiber bundles F, and disposed at such a position that a slight gap is formed between the regulating member 11 and the fiber bundles F when the gripper member 8 is located at the gripping position where the fiber bundles F are gripped by the gripper member 8 in association with the support sections 4.

Figure 7A:
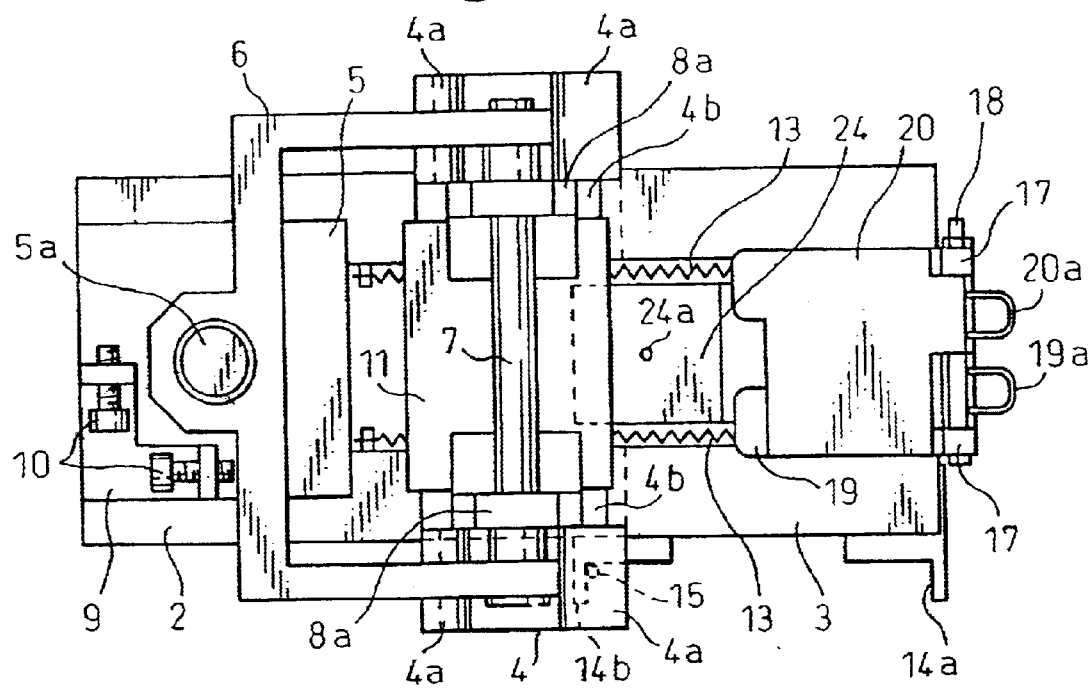
FIG. 7A is a plan view illustrating the movement of the movable member.
Figure 7B:
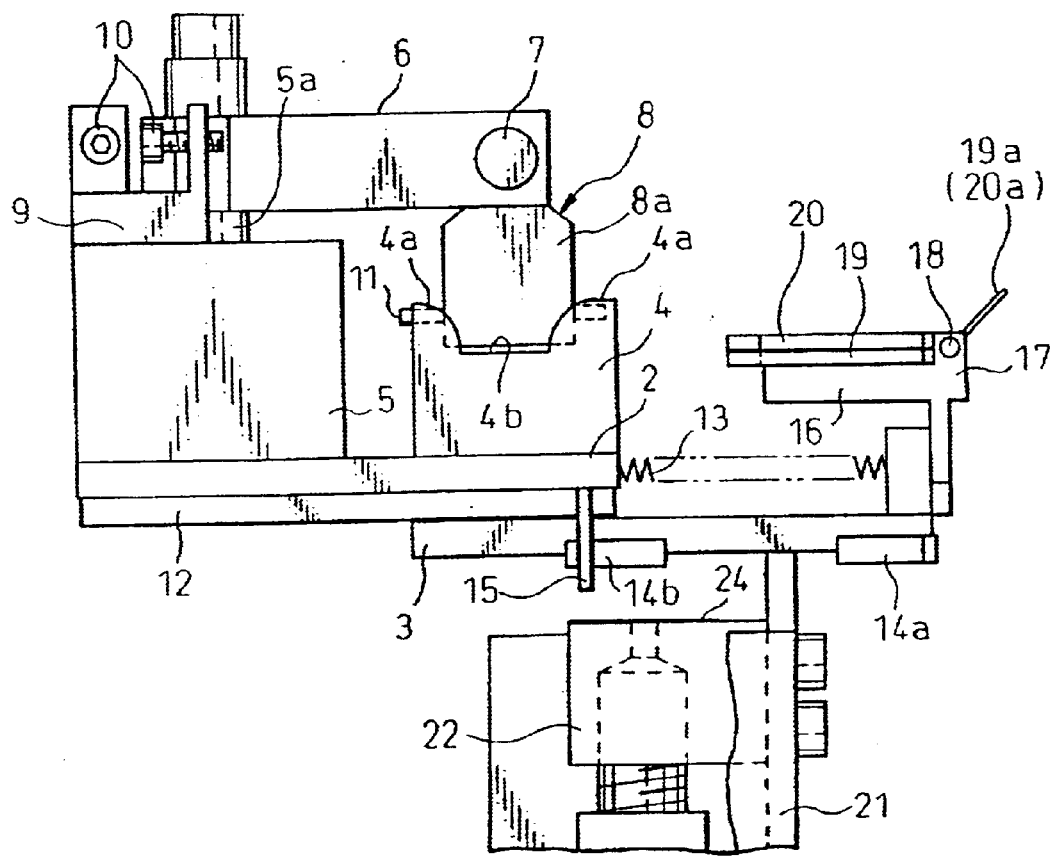
FIG. 7B is a side view illustrating the movement of the movable member.

The movable member 3 is movable along guide rails 12 fixed to the lower side of the linear portions 2a of the base 2 in the direction transverse (perpendicular in this embodiment) to the fiber bundles F held by the support sections 4. The movable member 3 is biased by springs 13 (as shown in FIGS. 5, 7A and 7B) to a reference position, and retained there by contact of an engagement section 14a fixed to the movable member 3 with a stopper 15 fixed to the guide rails 12. Also, the movable member 3 has an engagement section 14b to be brought into contact with the stopper 15 so that the movement of the movable member 3 is limited within a predetermined distance from the reference position. The springs 13 constitute a movable member returning means for returning the movable member 3 to the reference position.

A receiving section 16 is provided in the movable member 3 at a position between the support sections 4 at a level slightly lower than the fiber bundle gripping position of the support sections 4 when the movable member 3 is located at the reference position. Bearing members 17 projects from the proximal end of the receiving section 16, and a pin 18 is held by the bearing members 17. First and second presser members 19 and 20 are pivotally attached to the pin 18. The presser members 19 and 20 are movable between an operating position where the presser members are brought into contact with the fiber bundles F held by the support sections 4 and a retreating position where the fiber bundles F are allowed to be arranged onto the support sections 4.

The first presser member 19 is capable of nipping a first fiber bundle F in association with the receiving section 16 at a position lower than the gripper surface 4b of the support section 4. The second presser member 20 is capable of nipping a second fiber bundle F in association with the first presser member 19 generally at the same height as the gripper surface 4b. Handling knobs 19a and 20a project from the proximal ends of the presser members 19 and 20.

In FIGS. 3 and 4, a grip 21 which can be handled by the operator's hand is provided beneath the movable member 3. A nozzle block 22 is fixed to the upper portion of the grip 21, and connected to a compressed air supply pipe 23. On the top surface of the nozzle block 22, a thin plate 24 having an air injection orifice 24a is fixed. The air injection orifice 24a is disposed forward of the receiving section 16 (lefthand in FIG. 3) at a position not opposed to the fiber bundles F when the movable member 3 is located at the reference position, and passes a position opposed to the fiber bundles F as the movable member 3 moves from the reference position.

The operation of the fiber bundle joining apparatus 1 of the above-mentioned structure will now be described. FIGS. 1A to 2E are schematic perspective views illustrating the steps of the fiber bundle joining process. Note, in order to distinctively show two fiber bundles F to be joined, they are hatched in the opposite directions. When the fiber bundles F are to be joined together, the movable member 3 is initially disposed at its reference position and the gripper member 8 and the presser members 19 and 20 are located at their retreating positions, as shown in FIG. 1A. In this regard, although the actual retreating position of the gripper member 8 is defined by a position rotated at 90 degrees from the position shown in FIG. 1A, it is conveniently illustrated in the drawings as if being located above the table receiving section 16.

Figure 1C:
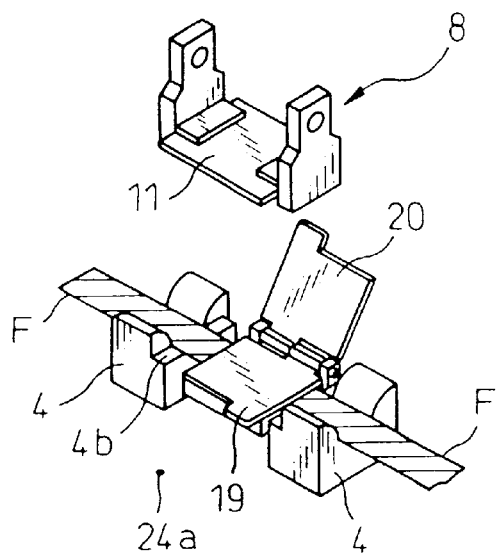
Figure 1D:
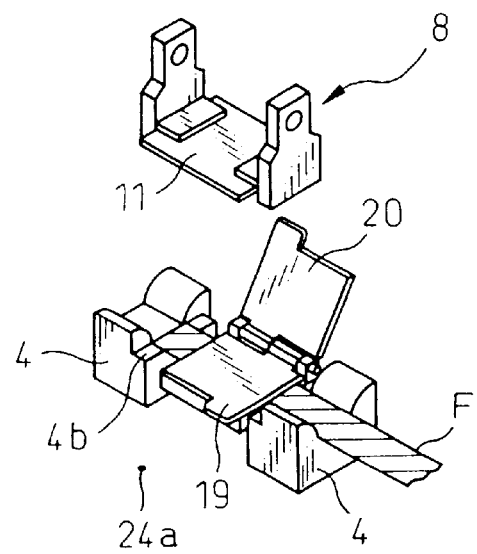
Figure 1E:
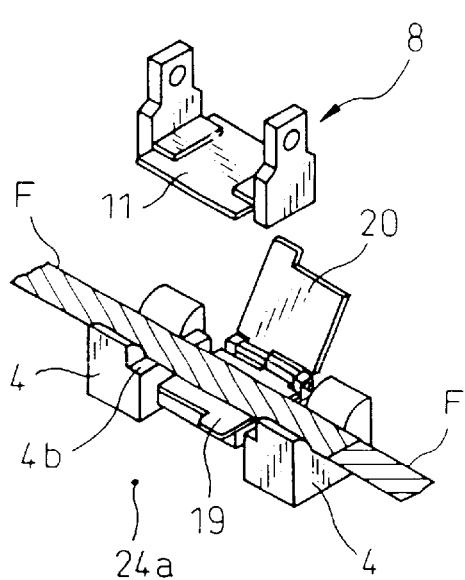
Figure 1F:
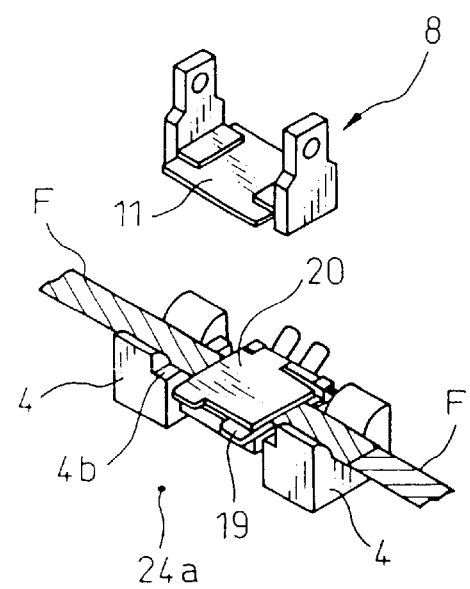
Figure 2A:
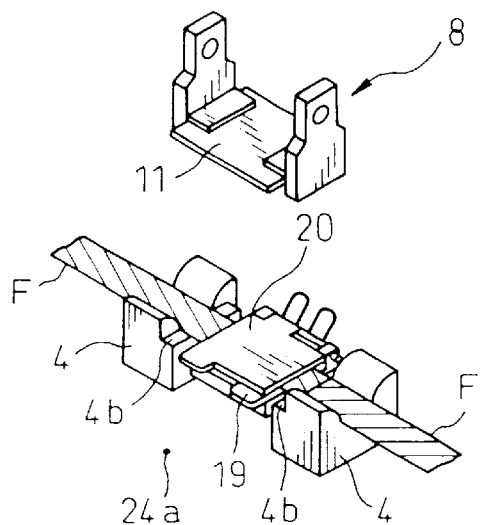
FIGS. 2A to 2F are schematic perspective views for illustrating the steps of the method of joining fiber bundles, succeeding to FIG. 1F.

In this stage, the first fiber bundle F is then placed on both the support sections 4 so as to bridge the receiving section 16, as shown in FIG. 1B, and the first presser member 19 is pivotally moved to its operating position, as shown in FIG. 1C. The first fiber bundle F is then moved so that one end of the first fiber bundle F is located on the left gripper surface 4b, as shown in FIG. 1D. Next, the second fiber bundle F is placed on the first presser member 19 and both the support sections 4 as shown in FIG. 1E, and the second presser member 20 is pivotally moved to its operating position, as shown in FIG. 1F. Then, the second fiber bundle F is moved so that one end of the second fiber bundle F is opposed to the right gripper surface 4b, as shown in FIG. 2A.

Figure 2B:
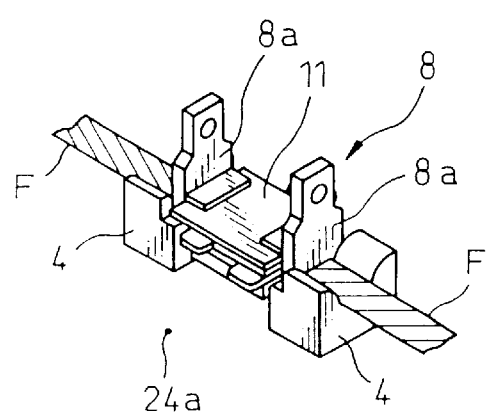
Figure 2C:
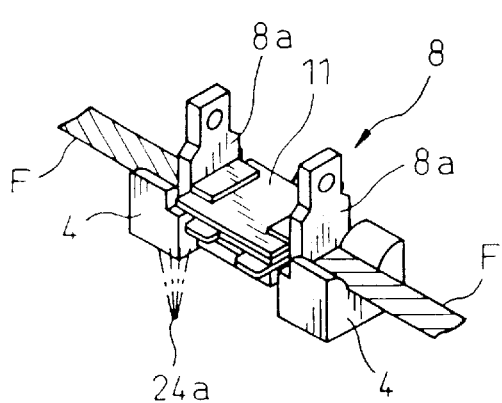
Figure 2D:
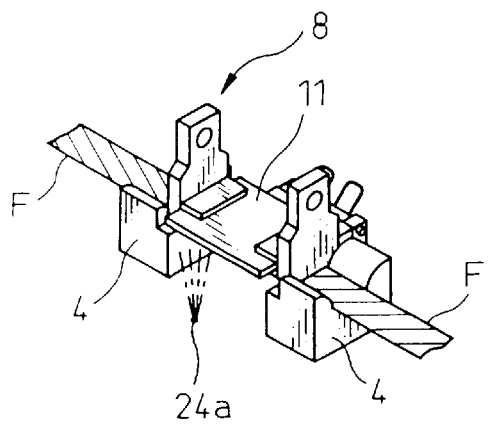

The support arm 6 is then rotated to locate the gripper member 8 at its operating position above the receiving section 16, and the pneumatic cylinder 5 is actuated to lower the gripper member 8 to the gripping position, as shown in FIGS. 2B and 7B. In this state, the two fiber bundles F are pressed by the gripper plates 8a at two points spaced apart by a predetermined interval from each other in the filament-extending direction (first direction) and gripped by the gripper member 8 and the support sections 4.

The supply of compressed air to the nozzle block 22 is then started (in a state shown in FIG. 2C), the operator moves the movable member 3 relative to the base 2 against the force of the springs 13. As a result, the movable member 3 is moved in the direction perpendicular to the fiber bundles F (second direction) to move the air injection orifice 24a and the presser members 19 and 20, and the air injection orifice 24a comes to a position opposed to the fiber bundles F gripped by the support sections 4 and the gripper member 8. Although the fiber bundles F are sandwiched between the presser members 19 and 20 and the receiving section 16, the holding force is derived only from the weight of the presser members 19 and 20, so the fiber bundles F are smoothly released from the presser members 19 and 20 and the receiving section 16 as the movable member 3 is moved.

Figure 2E:
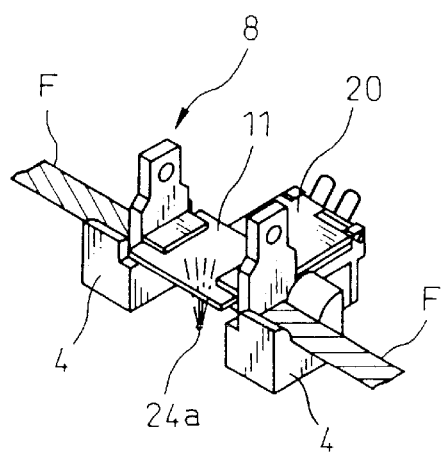
Figure 2F:
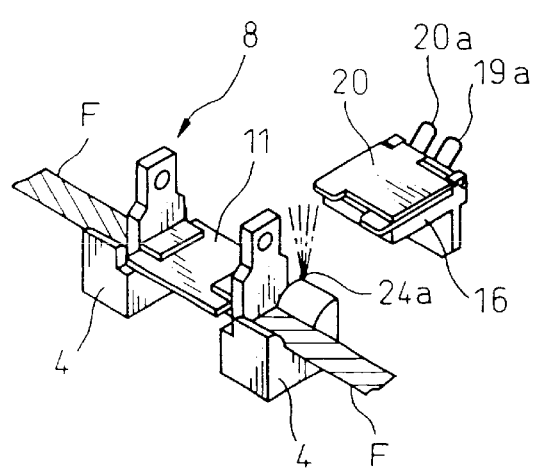

The air injection orifice 24a is thus moved below and across the fiber bundles F, as shown in FIG. 2E. As shown in FIGS. 2F and 7B, the movement of the movable member 3 is limited when the air injection orifice 24a is moved relative to the fiber bundles F to a position opposite to the reference position and the engagement section 14b abuts against the stopper 15. In this state, the presser members 19 and 20 are moved to their retreating position and the movable member 3 is returned to the reference position. The fiber bundles F are again subjected to compressed air injection while the movable member 3 returns to its reference position, and the fiber bundle joining process is completed in the state wherein the movable member 3 returns to its reference position.

After stopping the supply of compressed air, the pneumatic cylinder 5 is actuated to locate the gripper member 8 at an open position, and the support arm 6 is rotated to shift the gripper member 8 to its retreating position. The fiber bundles F, which are now joined into a single fiber bundle, are released from the support sections 4 to finish the series of joining steps.

Figure 8A:
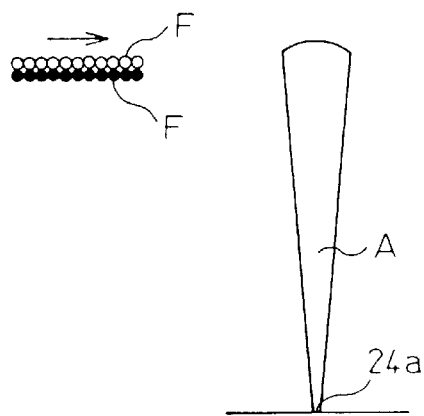
FIGS. 8A to 8D are schematic views illustrating the fiber bundle joining operation.
Figure 8B:
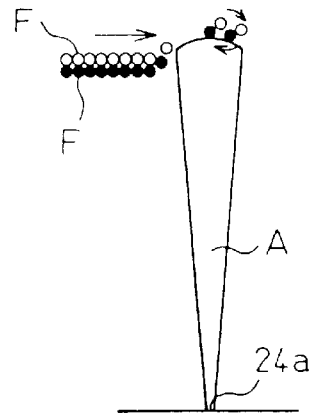
Figure 8C:
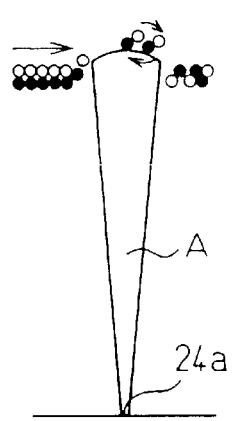
Figure 8D:
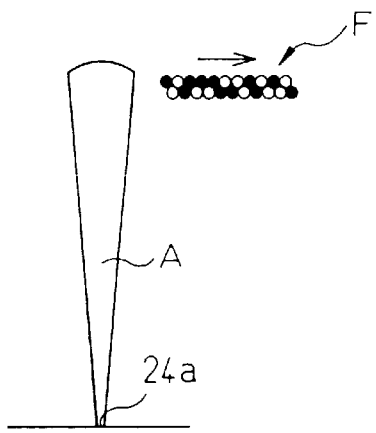

Next, the operation of the air injected from the injection orifice 24a for entangling filaments in the overlapped portion of the fiber bundles F will be described with reference to the schematic illustrations shown in FIGS. 8A to 8D. Note white and black dots in the drawings denote the filaments in the fiber bundles, respectively. As described above, during the relative movement of the fiber bundles F and the orifice 24a, the overlapped portion of the two flat fiber bundles F passes through the compressed air injection area continuously at a plurality of positions from one edge thereof in the widthwise direction of the fiber bundles F (leftward/rightward in FIG. 8A) to the other edge, while being nipped at opposite ends thereof. In this instance, the filaments in the overlapped portion are subjected to an opening action and a rotation action and the adjacent filaments are entangled with each other, as shown in FIGS. 8B and 8C. The filaments are not entangled one by one, but groups of a certain number of filaments are entangled. Since the filaments are rotated about the gripped end portions functioning as fulcrums by the action of injected air stream A, the arrangement of the filaments is maintained basically in the lengthwise direction of the fiber bundles F (the filament-extending direction) even in the entangled state, unlike the case wherein the fiber bundles are made to rotate while one end thereof is free.

Figure 9:
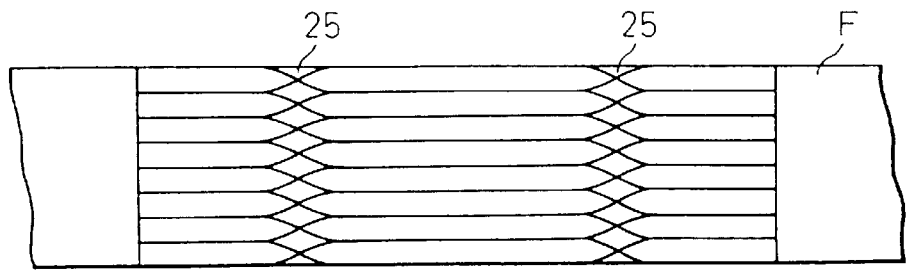
FIG. 9 is a schematic plan view illustrating a joined region of fiber bundles.

As an example, two fiber bundles, each composed of twelve polyaramid filaments (Kevlar; trade name) of 2250 denier arranged to have an opened width of 13 mm (corresponding to a carbon fiber bundle of 70,000 filaments), were joined, wherein filaments in one fiber bundle were dyed in red and those in another fiber bundle were in the original state (yellow). The observation of the joined region showed that in a region between the gripped portions, dyed and non-dyed filaments are mixed together in the central area but not entangled with each other. Also, as shown in FIG. 9, a plurality of entangled portions 25 extending in the widthwise direction of the fiber bundles F were seen at positions near the gripped regions, i.e., positions to which compressed air was injected, wherein the dyed and non-dyed filaments were entangled with each other like a braid.

Fiber bundles F of 7,000 carbon fiber filaments were joined together at the ends thereof and the obtained fiber bundle was arranged on a mandrel of a filament winding apparatus which includes a fiber bundle supply head and a guide bar between the bobbin and the supply head. The following problems were examined while the fiber bundle passed from the bobbin through the guide bar and the supply head; winding of filaments around guide bar, stripping-off of filaments when passing through the guide bar and the head, and turning-up of ends of filaments when passing through the supply head. The result is that there were none of winding of filaments on the guide bar, stripping-off of filaments when passing through the guide bar and stripping-off of filaments when passing through the head. Turning-up of ends of filaments was observed, but the fiber bundle was smoothly supplied.

In one attempt, the compressed air was injected to the fiber bundles F for one reciprocating operation in the first case, and for two reciprocating operation in the second case. A better result was obtained in the second case in that the dense entanglement occurred to enhance the tensile strength. However, even in the first case, the tensile strength was nearly equal to 20 kg which is sufficient for the ordinary use. In this regard, the tensile strength was measured by stretching a test sample of a single fiber bundle, both ends of which are joined together to form a ring, by a spring balance until the filaments in the joined region separated.

The following effects are obtained from this embodiment:

(1) Two flat fiber bundles F are overlapped with each other at their ends and the overlapped portion is pressed at two points spaced apart at a predetermined interval from each other in the filament-extending direction, and gas is injected to a region of the fiber bundles F between the two pressed points in the direction transverse to the filament-extending direction, so that a flat state is maintained after being joined, and the filaments are arranged basically in the lengthwise direction of the fiber bundles F even in the joined region. Thus, the filaments are expandable and contractible in the widthwise direction of the fiber bundles to increase a degree of freedom in the shape, and do not become too loose from each other, whereby the handling is facilitated.

(2) Since one of ends of the fiber bundles F overlapped with each other, located on the side closer to the air injection nozzle, is subjected to the action of compressed air in the slackened state, the degree of movement of the filaments becomes larger while they rotate about the gripped portions functioning as fulcrums due to the action of air. As a result, the filaments in this fiber bundle are easily entangled with those in the other fiber bundle on the side far from the air injection nozzle, whereby the tensile strength becomes higher in comparison with a case wherein the filaments are subjected to the injection of compressed air without being in a slackened state.

(3) The surface of the first presser member 19 on the side opposite to the receiving section 16 is in the same plane as the gripper surface 4b of the support section 4 when located at the pressing position. Accordingly, the amount of slackening of the fiber bundle F located closer to the air injection orifice 24a can be determined by the thickness of the first presser member 19, which simplifies the adjustment of the amount of slackening to a suitable value.

(4) Since the air injection orifice 24a moves in the widthwise direction of the fiber bundles F continuously from one edge to the other edge of the overlapped portion to inject compressed air thereto, opening effect and rotation effect, on filaments, are effectively carried out. Also, this arrangement is simple in structure in comparison with that wherein a plurality of injection nozzles or injection orifices are disposed in the widthwise direction of the fiber bundles F and air is sequentially injected therefrom.

(5) When the fiber bundles F are subjected to action of the compressed air, the regulating member 11 is located in the vicinity of the tow on the side opposite to the air injection orifice 24a, with the fiber bundles F sandwiched between the both. Thus, the compressed air spreads in the widthwise direction, whereby the rotation of filaments is facilitated to increase the strength of the joined region in comparison with a case wherein no regulating member exists.

(6) When the overlapped portion of the two fiber bundles F is gripped at two positions, the first fiber bundle F is nipped between the receiving section 16 and the first presser member 19 to position the end thereof, then the second fiber bundle F is nipped between the first presser member 19 and the second presser member 20 to position the end thereof. Accordingly, even if a gripping interval between the gripper plates 8a of the gripper member 8 is short, the length of the end of the fiber bundle F extending out of the respective gripper plate 8a can be short, so that the overlapped portion of the fiber bundles F is less likely to be turned up after being joined together during the passage thereof through the fiber bundle supply head.

(7) Since the receiving section 16 and the presser members 10 and 20 move together with the moving member 3, the arrangement for moving the receiving section 16 and the presser members 19 and 20 to a position where the action of compressed air is not adversely effected thereby when the compressed air is applied to the tows F in a gripped state, becomes simple.

(8) For moving the gripper member 8 and the receiving member 11 to a position where the operation for locating the fiber bundles F between the support sections 4 is not disturbed, an arrangement is adopted wherein they are rotatable about the piston rod 5a together with the support arm 6. According to this arrangement, the resultant apparatus becomes compact in size in comparison with that wherein a stroke of the piston rod 5a increases to move the gripper member 8 and the regulating member 11 away from the support sections 4.

(9) Since the fiber bundle joining apparatus has a size and weight capable of being held by one hand of the operator, it is possible to move the movable member 3 relative to the base 2 while gripping the grip 21. Accordingly, a drive for driving the movable member can be eliminated to simplify the structure, whereby the piecing operation can be carried out with high workability in optional sites and with a large degree of freedom.

(10) Since the guides 4a are provided for positioning the fiber bundles F in the widthwise direction, the two fiber bundles F can be readily overlapped with each other without shifting in the widthwise direction to result in a proper joining.

The second embodiment of the present invention will now be described in accordance with FIGS. 10 to 11F. This embodiment relates to a fiber bundle joining method wherein the ends of filaments in the joined region are assuredly prevented from turning up when the joined region of two fiber bundles F passes through the fiber bundle supply head.

Figure 10:
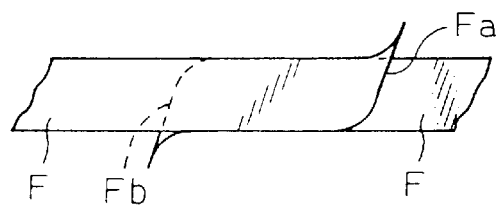
FIG. 10 is a schematic view illustrating a joined region of the fiber bundles.

In the fiber bundles F joined by the method of the preceding embodiment, ends Fa and Fb of filaments in the two fiber bundles F exist on the surfaces of the fiber bundles F in a non-restrained free state, as shown in FIG. 10. Accordingly, when the fiber bundles F moves rightward, as seen in FIG. 10, and passes through the fiber bundle supply head (not shown), the end Fa is liable to turn up, and on the contrary, when the fiber bundle F moves leftward and passes through the fiber bundle supply head, the end Fb is liable to turn up.

A main difference of this embodiment from the preceding embodiment resides in that a forward one of the ends of filaments in the overlapped portion of the fiber bundles F as seen in the moving direction of the fiber bundle passing through the fiber bundle supply head does not appear on the outer surface of the fiber bundle F. Since the injection of compressed air to the overlapped portion of the fiber bundles F while pressing the same at two points, to cause filaments to be entangled with each other is the same as in the preceding embodiment, other steps which may be different therefrom will be described with reference to FIGS. 11A to 11F.

Figure 11A:
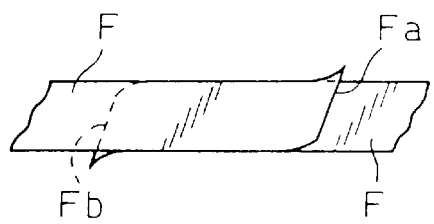
FIGS. 11A to 11F are schematic view illustrating steps of a method of joining fiber bundles according to the second embodiment of the present invention.
Figure 11B:
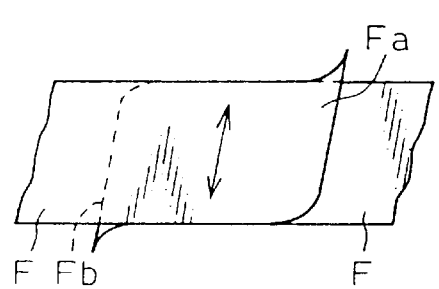
Figure 11C:
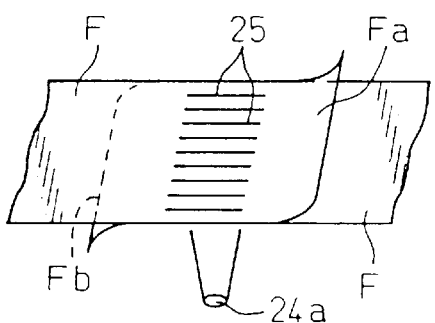

After ends of two fiber bundles F are initially overlapped with each other, as shown in FIG. 11A, filaments in the overlapped portion and in the portion near the overlapped portion are opened so that the width of the fiber bundle is widened to 1.5 times, or more, the remaining portion, as shown in FIG. 11B. Then, after opposite ends of the overlapped portion are nipped by the support sections 4 and the gripper member 8, compressed air is injected from the air injection orifice 24a to carry out the joining operation of the overlapped portion, as shown in FIG. 11C. The above steps are the same as those in the preceding embodiment, except that the width of the overlapped portion is widened.

Figure 11D:
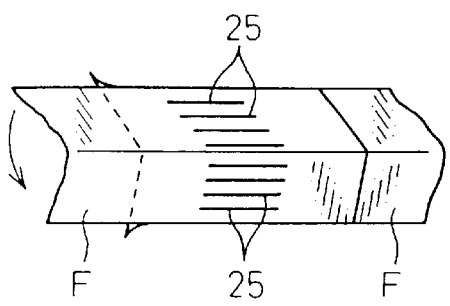
Figure 11E:
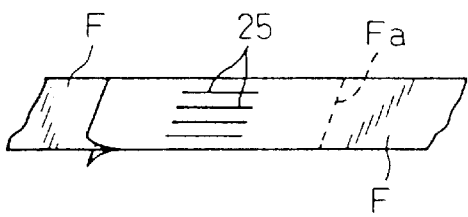
Figure 11F:
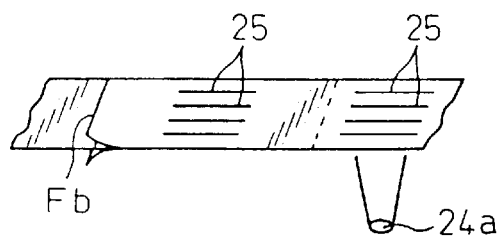

Next, as shown in FIG. 11D, the fiber bundles F are folded into two so that the forward end Fa in the moving direction of the fiber bundles when they are supplied to the supply head, is wrapped inside. As a result, as seen in FIG. 11E, the end Fa is located in the interior of the fiber bundle F. In this state, compressed air is again injected from the air injection orifice 24a to the fiber bundle at a position ahead of the end Fa in the moving direction to cause the filaments to be entangled with each other, as shown in FIG. 11F. Consequently, the width of the fiber bundle F becomes generally the same as in the preceding embodiment in a final stage. Note the entangled regions 25 are schematically illustrated by horizontal lines in FIGS. 11C to 11F.

Although the support sections 4, the gripper member 8 and others of the apparatus are not shown in FIGS. 11A to 11F, the joining operation can be carried out by the fiber bundle joining apparatus of the same construction as in the preceding embodiment except that the size of the channels of the guides 4a is variably arranged.

Accordingly, this embodiment has the following effects in addition to those of the preceding embodiment described in the above-mentioned items (1) to (10).

(11) After the first joining operation is carried out on the overlapped portion, the fiber bundles are folded so that the forward end Fa in the moving direction when the fiber bundle is supplied to the supply head is wrapped inside, and the second joining operation is carried out so that free edges of the folded fiber bundles are not open. Thus, the forward end Fa as seen in the moving direction when the fiber bundle is supplied to the supply head is not exposed on the outer surface of the fiber bundle F, whereby it is possible to assuredly prevent the end Fa of fiber bundle F from turning up when the joined region passes through the supply head.

(12) After the first joining operation is carried out on the overlapped portion of the fiber bundle F by spreading the width to 1.5 times or more from the original width of the respective fiber bundle F, the second joining operation is carried out on the folded fiber bundle which is folded so that the forward end Fa, as seen in the moving direction when the fiber bundle is supplied to the supply head, is wrapped inside. Thus, it is possible to readily obtain a fiber bundle having the joined region of the same width as in the preceding embodiment.

(13) Since the second joining operation is carried out at a point ahead of the end Fa of fiber bundle, a proper entanglement is obtainable even if the same conditions of air ejection are maintained in the second joining operation as in the first joining operation because the second joining operation is carried out in a fresh region free from the influence of the first joining operation.

The third embodiment of the present invention will be described with reference to FIGS. 12A to 13B. The main difference of this embodiment from the previous two embodiments is in that one sheet-like fiber bundle is formed of a plurality of flat fiber bundles.

Figure 12A:
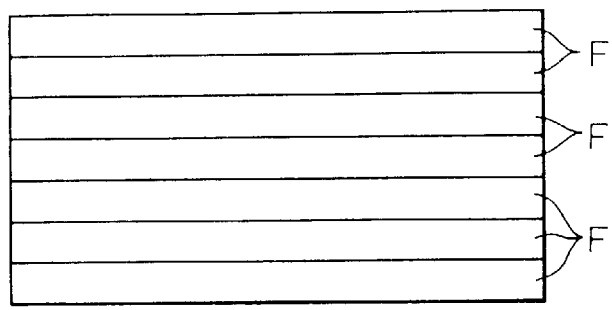
FIG. 12A is a schematic view illustrating some steps of a method of joining fiber bundles according to the third embodiment of the present invention.
Figure 12B:
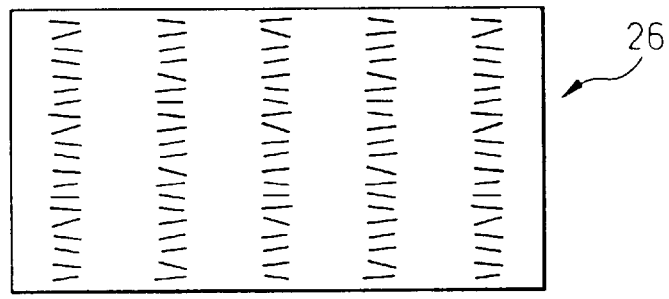
FIG. 12B is a schematic plan view illustrating a sheet-like fiber bundle.

As shown in FIGS. 12A and 12B, a sheet-like fiber bundle 26 is formed of a plurality of flat fiber bundles F arranged parallel to each other and adjoined to each other in a side-by-side manner and filaments in adjacent fiber bundles are entangled with each other to form a sheet. As a result, the sheet-like fiber bundle 26 is expandable and contractible in the direction transverse to the filament-extending direction and does not become loose.

Thus, the sheet-like fiber bundle 26 is suitable for forming a one directional material by being impregnated with a resin or, instead of cloth material, a plurality of the sheet-like fiber bundles 26 may be superposed on one another to form a three-dimensional fibrous structure. Or, it is possible to easily produce a one-directional material having an optional width by varying the number of flat fiber bundles F. Further, since the composite structure is formed in a state wherein filaments constituting the fiber bundle are entangled with each other, a bonding strength between the filaments increases to suppress the generation of cracks, whereby the physical property of the composite structure such as a resistance to impact is improved and the scattering of fiber is suppressed when the composite structure is broken.

One embodiment of a method for manufacturing the sheet-like fiber bundle 26 will be described.

Figure 13A:
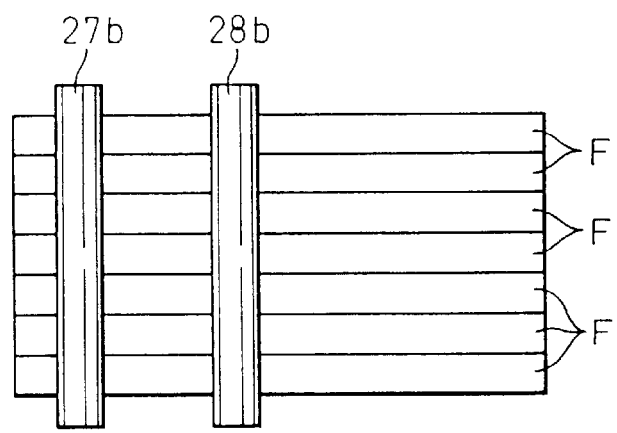
FIG. 13A is a schematic plan view illustrating a step of a method of joining fiber bundles.
Figure 13B:
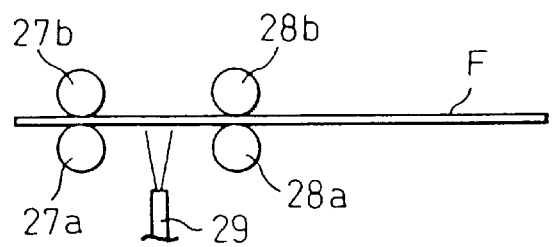
FIG. 13B is a schematic side view illustrating a step of the fiber bundle joining operation.

As shown in FIGS. 13A and 13B, a plurality of flat fiber bundles F, each composed of non-twisted filaments, are arranged parallel to each other in a side-by-side manner with no gap between the adjacent two fiber bundles, and nipped between two pairs of rollers 27a–27b and 28a–28b disposed at a predetermined interval. In this state, a nozzle 29 from which compressed air is injected moves across the fiber bundles F in the direction parallel to the rollers 27a–27b and 28a–28b. After the nozzle 29 reciprocates once and returns to the original position, the rollers 27a–27b and 28a–28b and the nozzle 29 are shifted relative to all the fiber bundles F at a predetermined distance in the filament-extending direction. And, the nozzle 29 reciprocates again while injecting compressed air. These steps are repeated to cause the filaments to be entangled in the adjacent fiber bundles F to form a single sheet-like fiber bundle 26. In this regard, the rollers 27a or others and the nozzle 29 are mounted to a frame not shown movable in the filament-extending direction of the fiber bundle F, and the nozzle 29 is movable relative to the frame in the filament-extending direction of the fiber bundle F.

In this method, the sheet-like fiber bundle 26 can be produced by a simple process of repeating the reciprocation of the nozzle 29 injecting compressing air to the fiber bundles F nipped by the two pairs of rollers 27a and others at a position between the pairs of rollers.

Figure 14A:
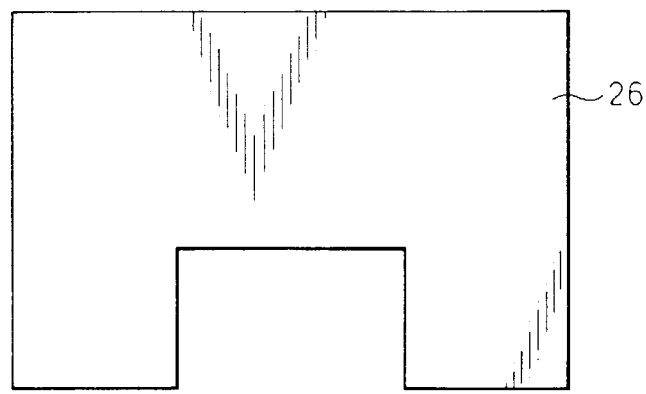
FIG. 14A is a schematic view illustrating a shape of a sheet-like fiber bundle according to another embodiment.
Figure 14B:
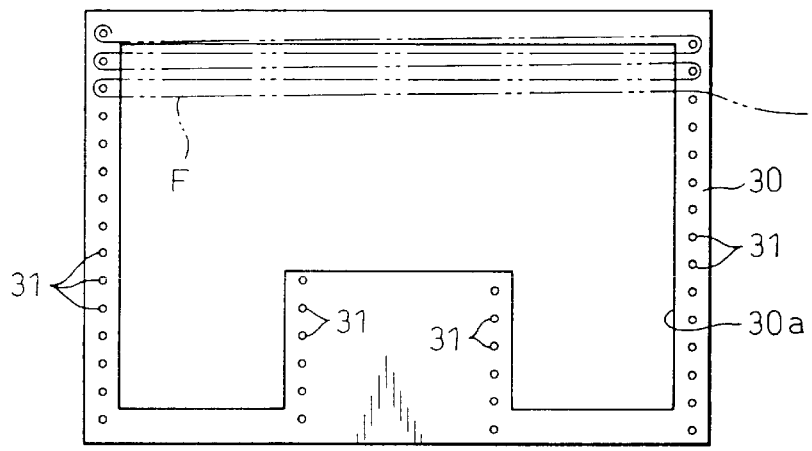
FIG. 14B is a schematic plan view illustrating a state wherein the joining operation is being carried out.

The present invention should not be limited to the above-mentioned embodiments but may include the following variations:

In the case where the sheet-like fiber bundle 26 is to be manufactured, if the fiber bundle 26 is of a rectangular shape or a square shape, it can be manufactured by the method according to the third embodiment by arranging flat fiber bundles of the same length parallel to each other in a side-by-side manner, but if a one-directional material of another shape is to be manufactured, it is necessary to cut the rectangular or square sheet-like fiber bundle 26 to the desired shape. Such a method is wasteful in fiber consumption to increase the manufacturing cost. The following variation is suitable for obtaining a sheet-like fiber bundle 26 of such a desired shape. For example, when a sheet-like fiber bundle 26 having a generally rectangular shape wherein part thereof is cut off, as shown in FIG. 14A, is produced, a frame 30 having an opening 30a of a desired shape 30a and a number of engaging pins 31 attached to the periphery thereof shown in FIG. 14B is prepared. The flat fiber bundle F is arranged to form a series of parallel portions covering the opening 30a while turning at the respective pins 31. Thereafter, the parallel portion of the fiber bundle is gripped at two suitable points spaced apart at a predetermined interval from each other in the filament-extending direction, and the process for injecting compressed air to a region between the gripped points is repeated to cause adjacent filaments to be entangled with each other. According to this embodiment, the consumption of fiber bundles is a minimum to reduce the production cost. By changing a shape of the opening 30a, it is possible to produce a sheet-like fiber bundle 26 having an optional shape, such as triangular, trapezoidal or circular, in the same manner.

Figure 15A:
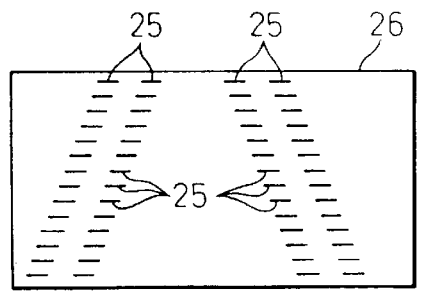
FIG. 15A is a schematic view of a sheet-like fiber bundle according to a further embodiment.

When the filaments forming the fiber bundle F are entangled with each other, the entangled regions 25 are not necessarily arranged in parallel to the widthwise direction of the fiber bundle, but may be arranged obliquely to the widthwise direction as shown in FIG. 15A. For example, in the third embodiment, if the nozzle 29 reciprocates while the two pairs of rollers 27a–27b and 28a–28b are continuously rotated to feed the fiber bundle F at a predetermined rate, the entangled regions 25 are arranged as shown in FIG. 15A.

An air-injecting position may be shifted obliquely to the filament-extending direction while maintaining the fiber bundle F stationary.

Figure 15B:
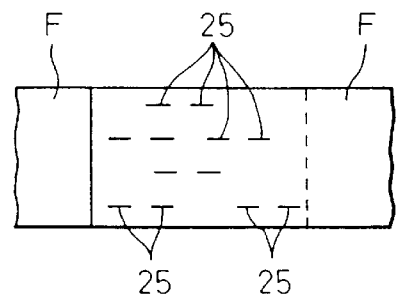
FIG. 15B is a schematic view of part of a sheet-like fiber bundle according to a furthermore embodiment.
Figure 16A:
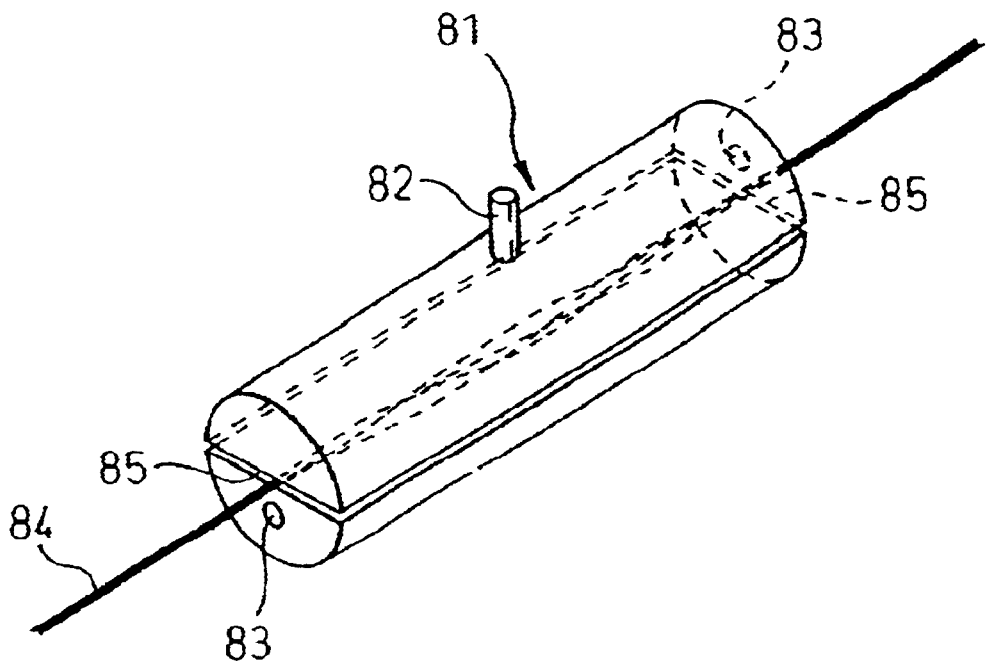
FIG. 16A is a schematic perspective view of a fiber bundle joining apparatus of a prior art.
Figure 16B:
FIG. 16B is a view illustrating a joined fiber bundle obtained by the prior art.
Figure 17:
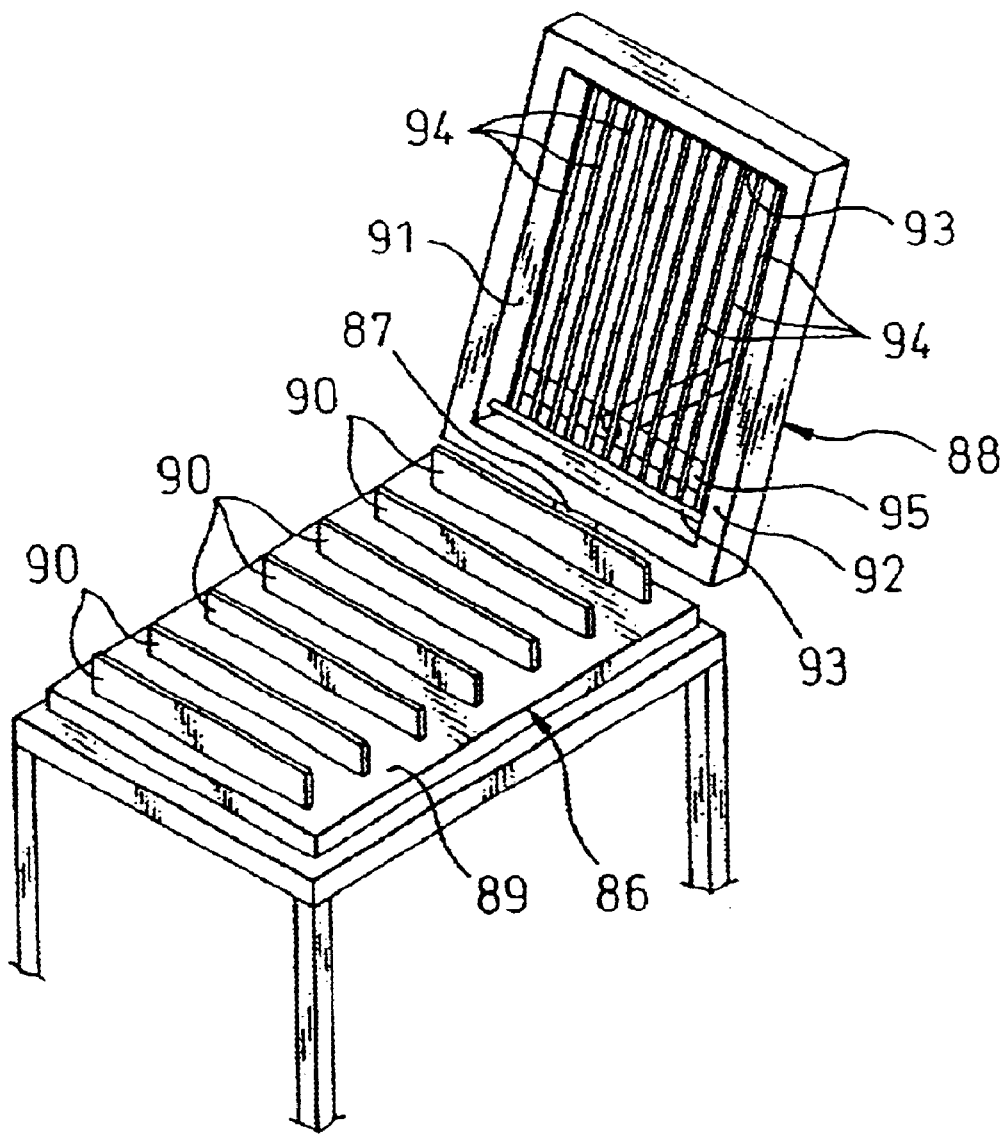
FIG. 17 is a schematic perspective view of another prior art joining apparatus.

When two fiber bundles F are joined together as in the first embodiment, a plurality of injection orifices may be provided in one nozzle, from each of which gas is injected. The entangled regions 25 are dispersed as shown in FIG. 15B. The respective one injection orifice is provided at a position where the action of gas injected from the other injection orifices is not adversely effected to the action of gas ejected from the one ejection orifice. In this case, means for moving the nozzle becomes unnecessary to simplify the overall structure.

Different kinds of fiber bundles may be pieced while maintaining a superposed state. For example, a fiber bundle of carbon filaments and a fiber bundle of synthetic filaments are superposed with each other, and the filaments in the fiber bundles are entangled with each other by the action of compressed air. In this case, after the filaments are entangled with each other, the combined fiber bundles are hot-pressed to result in a thermoplastic composite structure reinforced with carbon filaments.

Entangled portions similar to the entangled portions 25 in the third embodiment may be provided in a flat fiber bundles F along the entire length thereof at a predetermined interval in the filament-extending direction. This fiber bundle F is manufactured by carrying out the steps of holding a single flat fiber bundle of non-twisted filaments at two points, injecting gas to the fiber bundle between the holding points at a plurality of positions viewed in the direction transverse to the filament-extending direction to cause the adjacent filaments with each other, and repeating these steps at a suitable interval in the filament-extending direction. This fiber bundle F is not too loose unlike a flat fiber bundle of non-twisted filaments, to enhance the ease of handling. Also, a composite structure made of this fiber bundle F has an advantage in that the scattering of fiber upon the breakage is avoidable.

The operation for moving the movable member 3 relative to the base 2 may be carried out by an actuator instead of the operator's hand.

The base 2 may be fixed at a predetermined position, instead of adopting a portable structure wherein the base 2 is transported together with the movable member 2 while grasping the grip 21. In such a case, although the degree of freedom of a site of the joining operation is reduced, the operation for manually moving the nozzle relative to the fiber bundle F becomes simple.

A solenoid may be used in place of the pneumatic cylinder 5.

In the first embodiment, the regulating member 11 may be corrugated or of a convex surface having a maximum distance from a widthwise center of the fiber bundle F, instead of planar. Also, the regulating member 11 may be omitted.

In the first embodiment, the ends of the two fiber bundles may be simply overlapped with each other instead of slackening the first fiber bundles, and thereafter, compressed air is injected to the overlapped portion gripped at opposite ends thereof to cause the filaments to be entangled with each other.

The first presser member 19 may be solely provided for presetting a slackening amount of the first fiber bundle F while omitting the second presser member 20. Further, both the presser members 19 and 20 may be omitted. However, if both the presser members 19 and 20 are eliminated, it would be difficult to grip the fiber bundles by the gripper member 8 unless a length of the overlapped portion of the ends of two fiber bundles F is sufficiently long.

As an arrangement for continuously injecting compressed air to the entirety of a widthwise area of the fiber bundle, a plurality of nozzles may be disposed in the widthwise direction so that air is continuously injected from the nozzles one by one.

In the fiber joining method according to the second embodiment, instead of carrying out the first joining operation while widening the overlapped portion, the first joining operation may be carried out without widening the overlapped portion, and the second joining operation is carried out after widening the overlapped portion and then folding the same to half a width.

Material of the fiber bundle should not be limited to carbon fiber or aramid fiber, and superhigh-molecular weight polyethylene fiber or others may be used.

The following features are deducible from the above embodiments.

In the method of the present invention, the two fiber bundles are gripped by two pairs of rollers at points spaced apart at a predetermined interval from each other, and the nozzle injecting compressed gas is reciprocated between the pair of rollers in the axial direction of the rollers to cause the filaments to be entangled in the area between the two pairs of rollers, while shifting the gripped points of the fiber bundle sequentially in the lengthwise direction of the fiber bundle. The productivity is improved according to this invention in comparison with a method wherein the nozzle is moved between the two pairs of rollers and compressed air is injected therefrom to the fiber bundle which is intermittently shifted between the pair of rollers.

In the method of the present invention, the fiber bundle is arranged to engage with engaging portions provided in a frame having an opening of a desired shape, while repeating turns. Thus, a series of parallel portions of fiber bundles are formed in a side-by-side manner in the filament-extending direction. In this case, a one-directional material of a desired shape can be easily produced.

As described in detail above, the fiber bundle obtained according to the present invention has a large degree of freedom in the shape and is expandable and contractible in the direction perpendicular to the filament-extending direction and, in addition, the filaments in the fiber bundle are not too loose, i.e. it is difficult to separate the individual filament from each other, to facilitate the ease of handling.

What is claimed is:

1. A fiber bundle joining apparatus, comprising:

a base having a pair of support sections spaced apart from each other in a first direction for supporting ends of flat fiber bundles;

a gripper having a pair of gripping sections for cooperation with said support sections and moved by an actuator between a gripping position where fiber bundles are gripped by said gripper and said support sections and a retreating position where said fiber bundles are released;

a movable member disposed in the base and movable relative to the base in a second direction transverse to said first direction;

a presser provided in the movable member and movable between an operating position where it is capable of pressing the fiber bundles supported by the support sections and a retreating position where it allows the fiber bundles to be placed on the support sections;

a nozzle provided in the movable member so that a position thereof opposed to the fiber bundles gripped by the support sections and the gripper is variable as the movable member moves relative to the base; and a returning member returning said movable member to a reference position.

2. A fiber bundle joining apparatus as defined by claim 1, wherein the gripper is provided with a regulating member located in the vicinity of the gripped fiber bundles for covering the entire portions of the fiber bundles between the support sections when the gripper is located at the gripping position.

* * * * *